Jan. 9, 1962  R. W. HENDRICKS  3,015,858
PROCESS OF PREPARING SHAPED ARTICLES
OF ACRYLONITRILE POLYMER CONTAINING
FREE METAL PARTICLES

Filed Sept. 28, 1959  2 Sheets-Sheet 1

INVENTOR
ROBERT WILLIAM HENDRICKS

BY *Herbert M. Wolfson*
ATTORNEY

United States Patent Office 3,015,858
Patented Jan. 9, 1962

3,015,858
PROCESS OF PREPARING SHAPED ARTICLES OF ACRYLONITRILE POLYMER CONTAINING FREE METAL PARTICLES
Robert William Hendricks, Wilmington, Del., assignor to E. I. du Pont de Nemours and Company, Wilmington, Del., a corporation of Delaware
Filed Sept. 28, 1959, Ser. No. 842,872
14 Claims. (Cl. 18—57)

This invention relates to the preparation of polymers in the form of shaped articles containing a substantial amount of free metal or other insoluble particles. More particularly, the invention relates to the preparation of self-supporting, strong acrylonitrile polymeric films containing free metal particles, so-called metalized films.

Metalized films and similar metalized polymeric articles are becoming increasingly important in this electronic age. Shielding for electronic and magnetic equipment, tape for magnetic recording devices, units in radiant heating structures, seat covers for automobiles, the construction of electrolytic condensers and wave guides for microwave applications are only some of the uses for these metalized polymeric articles. If the cost of forming these articles could be reduced and the process of forming them improved, then the market for these materials would be almost limitless.

Heretofore, these metalized articles have been formed using sputtering, vacuum or electroplating techniques. Any method less complicated or less expensive than these has failed to provide adequate adhesion between particle and base material. Even the aforementioned techniques sometimes require a preliminary surface treatment, e.g., mechanical roughening, chemical modification, or so-called freshening, for satisfactory results. In some instances, the surface must be heated and, in the case of many metal particles, the prior art processes are a slow, tedious affair.

An object of the present invention is a relatively speedy, simple and economical technique to prepare metal-containing shaped acrylonitrile polymeric articles, the adhesion of metal particle to shaped article being firm and tenacious. A further object is to metalize without adversely affecting the desirable properties of the polymeric base material. Other objects will appear hereinafter.

Figure 1:
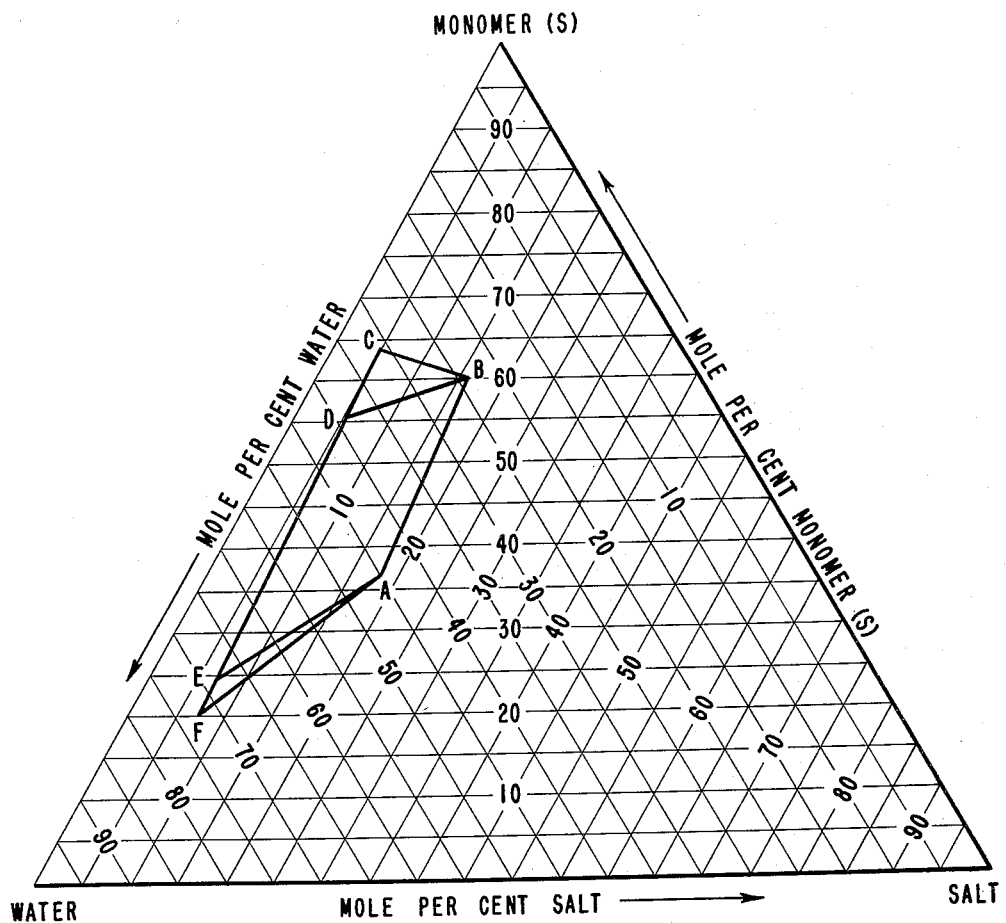

The process involves the steps of mixing three essential ingredients, 20–64 mole percent of at least one polymerizable monomer, 75–100% of said monomer being acrylonitrile, 5–18.5 mole percent of calcium thiocyanate and 24–73 mole percent water, each of the percentages of said essential ingredients falling within the area defined by ABCDEF of FIGURE 1, preferably within the area defined by ABDE of FIGURE 1; polymerizing the monomer in the mixture to form a calcium thiocyanate-containing polymer; shaping the polymer into a shaped article, preferably into a self-supporting film; completing polymerization if necessary; treating the calcium thiocyanate-containing article with a solution of a water-soluble metal salt of metals selected from the group consisting of cobalt, copper, iron, lead, nickel and silver; reducing said metal of said soluble metal salt to water-insoluble particles of the free metal of said soluble salt; and, thereafter, drying the particle-containing shaped article at a temperature of 50–250° C., preferably at a temperature above 90° C.

The term "shaped article," as used herein, is meant to include films, sheets, fibers, fabrics, rods, tubes and the like. The preferred form of shaped article, as will be evident from the subsequent examples, is a self-supporting film of the polymeric material.

In the preferred process, a tough oriented polyacrylonitrile film is formed as the base for the metal particles without fibrillating the film. This process comprises mixing the three essential ingredients (monomer(s), calcium thiocyanate and water) in critical proportions according to FIGURE 1 as above; polymerizing the monomer(s) in the mixture to form a calcium thiocyanate-containing polymer; shaping the polymer into a self-supporting film; if necessary, completing polymerization; elongating the film still containing calcium thiocyanate in at least one direction, preferably elongating the self-supporting film at least 1.5× in two mutually perpendicular directions; treating the calcium thiocyanate-containing film with a solution of a water-soluble metal salt of metals selected from the group consisting of copper, iron and silver; converting said soluble metal salt to water-insoluble particles of the free metal of said soluble salt; and, thereafter, drying the particle-containing film at a temperature of 50–250° C., preferably at a temperature above 90° C.; the latter three steps all performed while holding the film under tension.

This latter process, which is of particular significance when applied to the formation of highly oriented polymeric films, requires certain steps which steps were contrary to anything known heretofore in the prior art. Surprisingly, orientation that cannot be imparted without adversely affecting an acrylonitrile-containing polymeric film containing no inorganic salt, can be imparted to such a film containing the calcium salt. Furthermore, this orientation is not lost to any significant extent during the subsequent treating steps.

Figure 2:
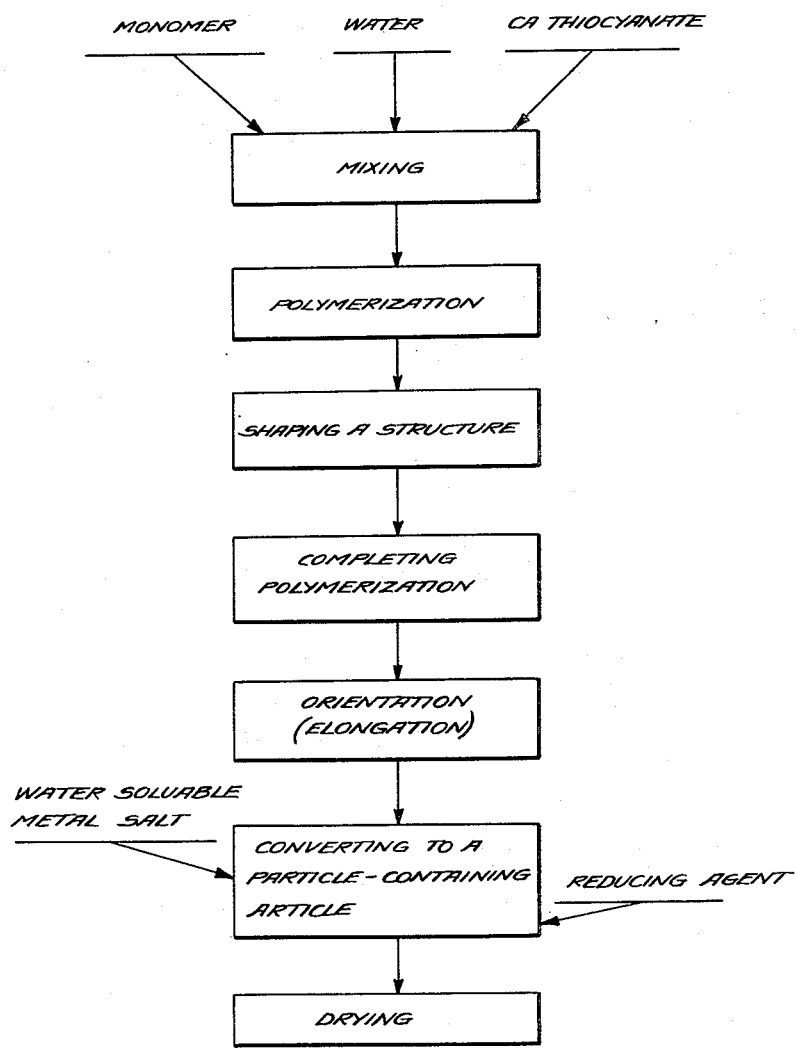

The critical steps required to produce these results will be discussed in subsequent sections under the following headings:

(1) Mixing essential ingredients
(2) Polymerization
(3) Shaping the material
(4) Completing polymerization
(5) Orientation
(6) Converting to a particle-containing article
(7) Drying FIGURE 2 shows an illustrative flow sheet of the above critical steps. These steps are described in detail hereinafter.

MIXING ESSENTIAL INGREDIENTS

The three essential ingredients—monomer/water/metal salt—must be mixed together in such proportions as to form a homogeneous or single-phase system at substantially room temperature. In the preferred process, the composition must be such that the homogeneous polymeric structure formed by polymerizing the mixture is orientable. "Orientable" is defined as capable of being stretched 4× (300%) at a temperature no higher than 30° C.

The compositions operable in the present process fall within the area ABCDEF of FIGURE 1. The points defining this area correspond to the following mole percentages of monomer/salt/water:

A  36.5/18.5/45
B  60/16/24
C  64/5/31
D  56/5.5/38.5
E  24/7/69
F  20/7/73

In referring to the proportions of the components, it should be understood that the sum of the mole percentages of the three essential components will add up to 100 mole percent. The content of additional ingredients present in minor amounts, such as a photoinitiator or the like are neglected.

While all compositions resulting in polymerized salt-containing films which are orientable in the present sense, i.e., those having tensile elongations of at least 300% (4×), are found to have utility in the preparation of biaxially stretched films, the compositions which provide polymerized salt-containing films having tensile elongations between 400% (5×) and 900% (10×) offer special advantages in the preparation of highly oriented, biaxially stretched films, and are, therefore, most preferred for use in this invention. These salt-containing films, in addition to having the ability to be stretched to an extent of at least 2.0× in each of two mutually perpendicular directions with an accompanying high orientation efficiency during stretching, also have a high level of toughness, as indicated, for example, by relatively high tensile strengths, which tends to facilitate the continuous high speed operation desired in a commercial process. The area within which such preferred compositions fall is given on FIGURE 1 by the area ABDE. The points defining this area correspond to the following mole percentages of monomer/salt/water:

A  36.5/18.5/45
B  60/16/24
D  56/5.5/38.5
E  24/7/69

It should be emphasized that the composition limits shown for the calcium salt all relate to the characteristics of the resulting mixtures, both before and after polymerization, at essentially room temperature. Since the relative solubilities of the essential components as well as the mechanical properties of the resulting polymeric films (related to orientability) are somewhat temperature sensitive, it will be recognized that at somewhat elevated temperatures or lowered temperatures the operable composition limits both before and after polymerization will be somewhat different than shown on the figure. Within the range from about 0 to 50° C., these differences are relatively small, however, and operating within this temperature range may be considered to be included explicitly within the scope of this invention.

The most critical aspect of the composition limits on monomer, water and salt which are polymerized to form the homogeneous salt-containing structure is that the film be orientable at substantially room temperature, as hereinbefore defined, regardless of whether orientation is contemplated. It is possible to prepare various homogeneous salt-containing films which are not orientable in the present sense merely by adjusting the composition of the mixture to be polymerized prior to polymerization. It would thereafter, of course, be possible to readjust the composition in order to effect conversion to an orientable structure, for example, by changing the water content of the coalesced structure, by aging the structure in an atmosphere of suitable humidity. Alternatively, a coalesced film falling outside of the critical composition area could be converted to a film of an orientable composition by immersing the film briefly in a bath of aqueous calcium thiocyanate solution of suitable concentration and temperature. While such variations are obviously less convenient than operating according to the direct preferred mode as herein described, they might be used if desired without departing from the spirit of this invention.

In the present invention the monomeric polymerizable component necessarily comprises at least 75%, and preferably at least 85% acrylonitrile. Other monomeric polymerizable compounds containing ethylenic unsaturation, and which are copolymerizable with acrylonitrile may be added to the monomeric acrylonitrile component. Examples of ethylenically unsaturated monomers copolymerizable with acrylonitrile include the acrylates and alkacrylates, such as methyl acrylate, ethyl acrylate, butyl acrylate, 2-ethylhexyl acrylate, methyl methacrylate, butyl methacrylate, hexyl methacrylate, etc.; vinyl chloride, vinyl acetate, vinylidene chloride, styrene, and compounds selected from the class consisting of vinyl arene sulfonic acids and their water-soluble salts, N-vinylpyrolidone, 2-methyl-5-vinylpyridine and other monomers disclosed in U.S. Patents 2,436,926 and 2,456,360.

In mixing monomer/water/metal salt together, the order of adding the components together appears to make no difference in the ultimate results. That is, water may be added to previously mixed metal salt and monomer or monomer may be added to previously mixed metal salt and water.

It has been found that polyhydric alcohols such as glycerol and ethylene glycol may substituted for a portion of the water in the mixture prior to polymerization. This has the effect of increasing the toughness of the polymerized films at room temperature, and also acts to increase the elongation and therefore the orientability of the films at elevated temperatures as compared with the purely water-containing films, which tend to lose water and thereby become less orientable at high temperatures. Since the alcohols tend to reduce the mutual solubilities of the salt and monomer as compared with equimolar quantities of water, their use is restricted to no more than 50% of the water normally used.

POLYMERIZATION

The type of apparatus and vessel employed for carrying out polymerization will depend upon the type of shaped structure which is to be ultimately formed from the polymer, and it will also depend upon the mode of polymerization, i.e., whether the shaped article is to be formed in accordance with a batch process or a continuous process. If the polymerization is to be carried out bath-wise, the liquid mixture of monomer/water/metal salt is introduced into a vessel which will form the polymerizing mass into its ultimate shape. For example, to form a film or sheet, a cell composed of two sheets of glass or suitable plastic material separated by a flexible gasket (as described in Rohm et al. U.S. Patent 2,067,580) may be employed as the confining vessel to form coalesced films or sheets. On the other hand, if a film or filament is to be formed continuously, the initial mixture of monomer/water/metal salt may be subjected to polymerization conditions in a vessel for a time sufficient to form a relatively fluid prepolymer (which is more viscous than the initial mixture), and this prepolymer may be continuously extruded into very thin tubes or rods to form filaments, or it may be extruded onto a continuously moving belt or drum in order to shape the fluid mass into the form of a film and then complete the polymerization.

Polymerization of the monomer/water/metal salt mixture may be carried out by conventional techniques known to the art. Energy required to effect polymerization may be supplied by heat, ultraviolet light, and/or ionizing radiation. When polymerization is effected by heat, well-known thermal polymerization catalysts may be used, such as the peroxides, e.g., benzoyl peroxide, and similar types of aromatic and aliphatic peroxides, or the well-known azo catalysts described in U.S. Patent 2,471,959 to Madison Hunt may be employed. When ultraviolet light is used, well-known photopolymerization catalysts may be employed such as benzoin and similar types of acyloin catalysts, and the acyloin ethers (benzoin methyl ether) described in U.S. Patents 2,367,660, 2,367,661 and 2,367,670. Polymerization may be effected in the substantial absence of any added catalyst by employing low or high energy ionizing radiation, such as particle irradiation (e.g., electrons) or electromagnetic irradiation (e.g., X-rays and gamma-rays). Other types of ionizing radiation include particle irradiation such as protons, deuterons and alpha-particles. The particles may be accelerated to a high speed by means of a suitable voltage gradient using devices such as a resonant cavity accelerator, a Van de Graaff generator, a betatron, a synchrotron, a cyclotron or the like. The radiation may equally be supplied by the use of radioactive isotopes.

It is found that the presence of atmospheric oxygen generally tends to provide a temporary inhibitory action towards polymerization at room temperature. This can easily be overcome in practice by the use of a slight excess of polymerization catalysts or ionizing radiation. There is, therefore, no necessity for excluding oxygen from the mixture prior to polymerization, although this can be done if desired.

SHAPING THE MATERIAL

Where this step fits into the sequence of steps of this invention depends upon the particular process to be employed for forming a shaped article, such as a film or filament. For example, in forming a salt-containing homogeneous film, the initial mixture of monomer/water/salt may be introduced into a glass cell composed of two glass plates separated preferably by a flexible or resilient gasket, and the mixture may then be polymerized to completion in such a cell. The resulting product is in the form of a preformed salt-containing film or sheet which is then ready for orientation.

On the other hand, such a process is limited to batch operation. A feasible continuous process would involve prepolymerizing the initial mixture of monomer/water/salt in a relatively large vessel to form a syrup or relatively viscous prepolymer which may then be readily extruded into a multiplicity of thin tubes or rods to form filaments; or it may be extruded onto a moving belt or drum to form a film.

The present invention is particularly adaptable to the formation of films and filaments, more particularly to the formation of highly oriented films containing polymer of high molecular weight. Therefore, it is necessary that sometime before completion of polymerization of the initial monomer/water/salt system, that the polymerizing mass be introduced into an apparatus which shapes the polymerizing mass into the essential shape of the desired final structure prior to completion of the polymerization to form the orientable, self-supporting, highly viscous, salt-containing structure. As mentioned hereinbefore, the scope of this invention embraces the formation of various types of shaped articles besides films and filaments, such as rods and tubes.

COMPLETING POLYMERIZATION

This step is necessary in the event that a continuous process is employed for forming shaped articles wherein the initial mixture of monomer/water/salt is prepolymerized in a separate vessel to form a relatively fluid viscous polymerizing mass and the polymerizing mass formed into a shaped article, such as a film or filament. In such cases, polymerization of the polymerizing mass must be substantially complete in order to form a tough, rubbery, orientable shaped article, since the monomer tends to exert a very noticeable plasticizing action for the shaped article. If polymerization were not substantially complete, it would be found that the characteristics of the resulting shaped articles would be difficult to control, due to the volatility of the unpolymerized monomer.

Completion of polymerization of the shaped article may be carried out employing the same or a different source of polymerization energy than that used in carrying out prepolymerization of the initial monomer/water/salt mixture.

ORIENTATION

The term, orientation, is used herein to apply to the step of elongating the homogeneous, salt-containing shaped article in one or two mutually perpendicular directions as in the preferred process. Elongation, as mentioned hereinbefore, may be carried out by stretching and/or rolling the article in one or two mutually perpendicular directions. In the case of orienting homogeneous salt-containing filaments, stretching may be carried out by passing the filaments around rolls or pulleys rotating at differential speeds. Film stretching may be carried out by a number of well-known techniques such as passing the film longitudinally between two pairs of nip rolls rotating at different speeds or by wrapping the film around rolls and stretching between a bank of slow rolls and fast rolls. Transverse stretching of film may be effected by using well-known tentering apparatus whereby tenter clips grasp the edges of the film and diverge gradually as the film moves in a longitudinal direction. Any well-known stretching apparatus of the type described in the prior art may be employed for stretching a homogeneous salt-containing film simultaneously in two directions. It is also within the scope of the present invention to extrude the prepolymer system into tubular form and thereafter orient the tubing by blowing, where a unidirectional stretch is desired, or by blowing and longitudinal stretching of the tubing where biaxial stretching is desired.

In order to maintain the composition of the homogeneous salt-containing article relatively constant, that is, the same as the composition of the article immediately after completion of polymerization, the salt-containing article is oriented in an inert gaseous atmosphere or in air. Orientation is preferably carried out essentially immediately after completion of polymerization, but the salt-containing article may be stored under conditions such that the composition of the article remains substantially constant prior to orientation. It is desirable that the atmosphere in which the salt-containing article is stretched have a relative humidity of at least 30%. On the other hand, the condition of the inert gaseous atmosphere must be such that the composition of the salt-containing film during orientation is not substantially changed, as by the addition of excess water.

In order to obtain the benefits of the present process, the coalesced film or other structures must be stretchable in a single direction to an extent of at least $4\times$ and preferably $5\times$ at room temperature in air at 50% relative humidity. In the case of forming biaxially oriented film, the homogeneous salt-containing film structure must be stretchable in each of the two mutually perpendicular directions to an extent of at least $1.5\times$ and preferably at least $2\times$ in order to be capable of being converted to final tough films having a relatively high level of impact strength and durability. To form films having maximum toughness, the homogeneous salt-containing films should be stretched to substantially the highest extent possible in two mutually perpendicular directions which may be up to $3.5\times$ in each direction. However, to form films having a relatively high degree of post-formability combined with suitable toughness for laminations to metal substrates, the homogeneous salt-containing films are preferably stretched $1.5\times$ to $2.0\times$ in the two mutually perpendicular directions.

CONVERTING TO A PARTICLE-CONTAINING ARTICLE

After completing polymerization or, in the preferred process, after orientation, the calcium thiocyanate-containing polymeric article is treated with an aqueous solution, preferably a saturated solution of a "water-soluble" metal salt. The expression "water-soluble" metal salt refers to a salt of an acid and a metal as defined above which is soluble in water at 20° C. to the extent of at least one mole percent, preferably at least ten mole percent. The soluble metal salt is selected with an eye toward the ultimate metal-containing film. Thus, a ferric salt such as ferric chloride or the like may be used if a magnetic tape containing iron is contemplated. A list of the salts useful in the present invention are marked by a cross (X) in the following table, Table I.

*Table I.—Water-soluble metal salts for use in present invention*

| Negative ion | Nitrate | Sulfate | Bromide | Chloride | Iodide | Acetate | Chlorate | Thiocyanate |
|---|---|---|---|---|---|---|---|---|
| Metal ion: | | | | | | | | |
| Cobalt | X | X | X | X | X | X | X | |
| Copper | X | X | X | X | | X | | |
| Iron (ferric) | X | X | X | X | X | | | X |
| Lead | X | | | | | X | X | |
| Nickel | X | X | X | X | X | X | X | |
| Silver | X | | | | | | X | |

The following seven aqueous salt solutions have been found to be particularly suitable for the process of the present invention: 25–50% silver nitrate, 30–70% ferric chloride, 15–25% cuprous chloride in an acidified solution, as well as 30–50% cupric nitrate, 20–35% nickel chloride, 15–30% lead acetate and 40–70% nickel nitrate.

The conversion to insoluble particles may entail reducing the impregnated metal salt to the free metal by reaction with a solution of sodium borohydride, hydroquinone, pyrogallol, catechol, diborane, sodium sulfite, sodium bisulfite, sodium hyposulfite, hypophosphorous acid, hydrazine, hydrazine hydrochloride or reducing sugars such as dextrose. Mixtures of metal salts may be employed if desired with the resultant product, after reduction, containing metallic magnetic alloys, such as nickel-cobalt. Such alloy compositions have magnetic properties making them useful in magnetic tapes.

Conversion to useful insoluble metal salts may be accomplished by reaction with other normally soluble salts or an acid. Thus, the soluble ferric thiocyanate may be reacted with sodium phosphate or sulfide or with corresponding acids to convert the ferric thiocyanate to insoluble ferric phosphate and ferric sulfide. These latter salts impregnated in structures tend to impart flame-resistance, fungus-resistance, static-resistance, etc., to the structures. Some impregnated structures make excellent radiation shields or serve as substrata for decorative laminates.

The final concentration of particles in and on the polymeric material may range anywhere from 0.5% to as high as 65% of the total weight of polymer plus particles, without substantially altering the physical properties of the polymeric substrate. However, for most purposes, a range of 15–45% of particles suffices.

Although treatments involving immersion of the calcium thiocyanate-containing polymeric materials in baths of the particle-providing reactants have been described, it should be understood that other modes are also useful. Thus, brushing, spraying or painting in any manner may be used successfully.

In the case of the oriented article, it is important to maintain the article under tension during these treatments. Otherwise, the base polyacrylonitrile film tends to lose the improved properties provided by orientation.

DRYING

In order to complete the process of the present invention, it is necessary to remove water from the particle-containing structure, the remaining water being essentially that which is in equilibrium with the surrounding atmosphere. Here again, it is critical that when the drying step is carried out on an oriented film or filament or other oriented shaped article, the article is maintained under tension such that essentially no change in dimensions is permitted during the drying step.

While relatively highly oriented, durable films and other structures are obtained by drying at room temperature or thereabouts while maintaining tension, structures of increased orientation and decreased void content are obtained by heat treatment at temperatures from 90° C. to the temperature beyond which thermal degradation of the polymer occurs, preferably from 150°–250° C., for a time sufficient to raise the film density to at least 1.170 grams per cubic centimeter as described in copending application U.S. Serial No. 740,140, filed June 5, 1958, to K. R. Osborn and assigned to the assignee of the present application. This effect is also useful in locking in the metals or salts introduced by the process of this invention. A denser structure may also be obtained by pressure rolling the film after it has been dried.

The final articles may be used as such as electrolytic condensers, in magnetic recording devices, as catalyst carriers, as automobile seat covers, etc. The articles may also be used as a base material or anchorage subcoat upon which to plate other metals. Superior adhesion of the resulting metallic coating is thus obtained.

The invention will be more clearly understood by referring to the examples which follow, Example 1 representing the best mode contemplated for performing the process of the invention. The examples, which illustrate specific embodiments of the present invention, should not be considered to limit the invention in any way.

EXAMPLE 1

The following components were mixed together at room temperature to form a clear, homogeneous relatively non-viscous solution:

| | Parts by weight | Mole [1] percent |
|---|---|---|
| Acrylonitrile monomer | 78.1 | 34.9 |
| Calcium thiocyanate | 57.2 | 8.7 |
| Distilled water | 42.8 | 56.4 |
| Benzoin methyl ether | 1 | |

[1] Based on sum of monomer, salt and water.

The solution was poured between two thin glass plates spaced 20 mils apart (using a film of polyethylene terephthalate 20 mils in thickness as a spacer), employing clamps to hold the glass plates in position. The resulting closed cell was exposed to ultraviolet light from a bank of five Westinghouse fluorescent sunlamps (15 watts each) for approximately 20 minutes. The plates were separated and the resulting clear, homogeneous, coalesced, salt-containing film was stripped from the plates. This film was clear, relatively tough, flexible, and displayed an elongation of over 300%. Qualitatively, the film resembled a sheet of clear vulcanized rubber.

The polymerized, salt-containing film was then stretched at room temperature (23° C.) and under conditions of 50% relative humidity to an extent of about 2.5 times (2.5×) (150% elongation) its original dimensions in two mutually perpendicular directions, using simultaneous stretching in a machine stretcher. In the machine stretcher, stainless steel clips approximately 2 inches long with 0.5 inch serrated jaws were used to clamp the film in the machine. Three such clips were attached to each side of the film, and blotting paper was used to insulate the film from the metal jaws of the clips. Each set of three clips on each side of the film was connected to a motor-driven stretcher bar. The stretcher bars on opposite sides of the film were then pulled apart to achieve simultaneous biaxial stretching. The connecting arms of the stretcher were shaped like inverted U's so that the film while held by the clips could be placed in a galvanized metal pan approximately two inches in depth.

After the film was stretched to the desired extent in both directions, the stretcher was stopped and maintained in a position to hold the film under tension. Then, the film was converted to a red ferric thiocyanate-containing film by immersing it for 2 minutes at room temperature in a solution made by dissolving ferric chloride hexahydrate. The ferric thiocyanate contained in the film was then converted to metallic iron by immersing it for 2 minutes in a 2% solution of sodium borohydride in water. The resulting stretched, iron-containing film was clamped in square frames to keep the film under tension, and thereby restrict dimensional change in the directions of stretch. The frames consisted of stainless steel squares made from strips of metal approximately one inch wide, and the films were held in place in the frames by means of clamps. The stretched film, clamped in this manner, was dried in an oven for one hour at 130° C.

The resulting film was black with a shiny surface and was attracted by a magnet. Its physical properties are given in the following table, Table II. The inherent viscosity of the polymer in this film was 6.4.

*Table II*

| Physical property: | Example 1 |
|---|---|
| Tensile strength (p.s.i.) | 26,200 |
| Elongation (percent) | 57 |
| Initial tensile modulus (p.s.i.) | 639,000 |
| Pneumatic impact strength (kg.-cm./mil) | 6.3 |
| Density | 1.1745 |

In the above table and in the examples to follow, the properties of the acrylonitrile polymer films prepared by this invention were measured in accordance with the following tests:

PNEUMATIC IMPACT STRENGTH

Pneumatic impact strength is the energy required to rupture a film. It is reported in kilogram-centimeters/mil of thickness of the film sample. Pneumatic impact strength is determined by measuring the velocity of a ball mechanically accelerated by air pressure, first in free flight and then in flight immediately after being impeded by rupturing the test film sample. In this test, the film sample is 1¾"x1¾". The projectiles are steel balls ½" in diameter and weighing 8.3 grams. The free flight ball velocity is 40±2 meters/second. The velocities are measured by timing photo-electrically the passage of the steel balls between two light beams set a definite distance apart. The pneumatic impact strength is measured by the loss in kinetic energy of the ball due to the rupturing of the film sample. It is calculated from the following formula:

Constant × (square of velocity in free flight minus square of velocity in impeded flight)

where the constant is directly proportional to the weight of the projectile and inversely proportional to the acceleration due to gravity. This test is carried out at 23° C. and 50% relative humidity, and the test samples are conditioned for 24 hours at 23° C. and 50% relative humidity.

TENSILE STRENGTH, ELONGATION AND INITIAL TENSILE MODULUS

These measurements are made at 23° C. and 50% relative humidity. They are determined by elongating the film sample (samples were cut with a Thwing-Albert cutter which cuts samples 0.25" wide) in an Instron tensile tester at a rate of 100% per minute until the sample breaks. The initial head-to-head gap is 2", and the salt-containing coalesced film test samples are clamped between blotting paper in order to prevent tearing at the clamps. The force applied at the break in pounds/square inch (p.s.i.) is the tensile strength. The elongation is the percent increase in the length of the sample at breakage. Initial tensile modulus in p.s.i. is directly related to film stiffness. It is obtained from the slope of the stress-strain curve at an elongation of 1%; both tensile strength and initial tensile modulus are based upon the initial cross-sectional area of the sample. Measurements made on essentially dry salt-free films are made after aging the film sample at the test temperature and humidity for at least 24 hours. Measurements made on salt-containing coalesced films are made without such conditioning, however. Instead they are made substantially immediately after exposing the film to the atmosphere, the film being protected from possible change of water content prior to testing by storage within closed containers.

DENSITY

The density of the film specimen is measured by placing the specimen in a liquid column exhibiting a substantially linear density gradient. The level at which the specimen comes to rest is compared to the levels of standards of known density. The density of the film specimen is obtained by interpolation between the levels of the density standards. With the films of this invention, a suitable density gradient is prepared by mixing heptane and carbon tetrachloride.

INHERENT VISCOSITY

The inherent viscosity, a relative measure of molecular weight, is defined as follows. A solution containing 0.05 gram of polyacrylonitrile per 100 milliliters of dimethyl sulfoxide is prepared by dissolving the polymer in vacuum distilled dimethyl sulfoxide containing less than 0.05% water (by weight) using high speed stirring for 60 minutes with the solution maintained at 100° C. The resulting solution is cooled to room temperature, then 6 milliliters of said solution are transferred to an Ostwald-Fenske viscometer, Series 75. The viscometer is next placed in a thermostat maintained at 30° C., and the polymer solution is allowed to flow through the capillary of the viscometer. The efflux time is taken as the time required for the meniscus of the solution to pass between the two calibration points of the capillary. This process is repeated until successive efflux times agree to within 0.2%. The average of said efflux times is taken as $t_s$, the solution time. An equal volume of pure solvent which has been subjected to an identical stirring and heating cycle is run through the viscometer using the same procedure, in order to obtain $t_0$, the solvent time. The quotient of solution time divided by solvent time ($t_s/t_0$) is defined as the relative viscosity. The inherent viscosity is defined as being equal to the natural logarithm of the relative viscosity divided by the solution concentration expressed as grams/100 milliliters.

EXAMPLE 2

Example 1 was repeated except that the salt-containing polyacrylonitrile film was not stretched.

The film was converted to a red ferric thiocyanate-containing film by immersing it for 2 minutes at room temperature in a solution made by dissolving ferric chloride hexahydrate. The ferric thiocyanate contained in the film was then converted to metallic iron by immersing it for 2 minutes in a 2% solution of sodium borohydride in water. The resulting film was black with a shiny surface and was attracted by a magnet.

EXAMPLE 3

In an experiment essentially identical with that described under Example 1, the wet polyacrylonitrile film containing calcium thiocyanate was treated with a saturated solution, about 25%, of cuprous chloride in a concentrated hydrochloric acid solution having a pH of approximately 1, to form cuprous thiocyanate in the film. This film was reduced by immersion for 2 minutes in a 2% solution of sodium borohydride in water to give a dark brown film which contained finely divided particles of metallic copper.

EXAMPLE 4

Following the procedure described in Examples 1 and 3, a portion of the wet polyacrylonitrile film containing calcium thiocyanate was immersed for 1 minute in a saturated aqueous silver nitrate solution, then treated with a 2% aqueous sodium borohydride solution. The treatment with silver nitrate caused the film to turn cloudy, due to the formation of insoluble silver thiocyanate. After rinsing the film in acetone and distilled water, it was found to be covered with metallic silver. This could be polished to a very shiny reflective surface.

After overnight drying, the resistance of a strip of film 20 mils thick, dimensions 1" x ½", with clip electrodes fastened to the ends, was less than 2 ohms, corresponding to a surface resistivity of less than 1 ohm/square. The adhesion of the silver, as tested by scraping with a knife, was exceptionally good. A microphotograph of the cross section of the film showed the formation of opaque silver on the surface as well as within the outer layers of the film, with retention of the transparent center of the film. Before trimming the edges of these samples, the film conducted current from one side to the other; after trimming it would not. Such a two-side plated film is useful as a condenser.

EXAMPLE 5

In this example the limits for the operable compositions shown in FIGURE 1 were determined. A composition of acrylonitrile, calcium thiocyanate and water, the mole percentages of which are shown in Table III, was mixed together at room temperature. To the mixture was added 0.5% by weight benzoin methyl ether, based on monomer content, as photoinitiator. The resulting mixture was then stirred at room temperature either until a homogeneous solution was obtained or until it was determined that more than one permanent phase had formed. Where more than one phase was thought to have formed, the stirring was carried out for a period of at least one hour prior to discarding the solution. In those cases in which a single liquid phase had formed, the pH of the resulting solution was adjusted to 6–8 by the addition of acid and the solution was subjected to photopolymerization in glass cells as described above to form homogeneous, coalesced salt- and water-containing polymeric films. It was found that the clarity of the final film was improved by this pH adjustment. In order to insure complete polymerization, irradiation was carried out for a period of two hours.

The resulting homogeneous, polymerized, salt-containing films having inherent viscosities ranging from 5 to 12 were then tested for elongation at room temperature (23° C.). The results are summarized in Table III.

Table III

| Test | Starting composition (mole percent monomer/salt/water) | Elongation (percent) |
|---|---|---|
| A | 58.5/5.5/36 | 320. |
| B | 59/10/31 | 305. |
| C | 59.2/15.1/25.7 | 442. |
| D | 45.5/7.5/47 | 492. |
| E | 41.3/8.2/50.5 | 550. |
| F | 40.2/10.3/49.5 | 541. |
| G | 35/7/58 | 458. |
| H | 32.3/10.4/57.3 | 510. |
| I | 36.4/18.8/44.8 | 1,700. |
| J | 22.5/7.5/70 | 902. |
| K [1] | 63.5/10.6/25.9 | 71. |
| L [1] | 57.0/18.3/24.7 | <5. |
| M [1] | 50.4/16.2/33.4 | 18. |
| N [1] | 48.5/25.0/26.5 | <5. |
| O [1] | 43.4/22.5/34.1 | 205. |
| P [1] | 21.5/11.1/67.4 | 260. |
| Q [1] | 2.6/0/97.4 | Two separate liquid phases. |
| R [1] | 8.7/5.5/85.8 | Do. |
| S [1] | 21.0/6.8/72.2 | Do. |
| T [1] | 28/7/65 | Do. |
| U [1] | 33.3/6.9/59.8 | Do. |
| V [1] | 40.3/6.7/53 | Do. |
| W [1] | 52/6/42 | Do. |

[1] Outside operable range of compositions.

Having fully described the invention, what is claimed is:

1. A process for preparing shaped polymeric articles which comprises the steps, in sequence, of mixing 24–73 mole percent of water, 5–18.5 mole percent of calcium thiocyanate and 20–64 mole percent of at least one polymerizable monomer, said monomer composed of 75–100%, by weight, of acrylonitrile and the remainder being an ethylenically unsaturated monomer copolymerizable with acrylonitrile, the mole percentages of the water, the calcium thiocyanate and the monomer falling within the area ABCDEF of FIGURE 1; polymerizing said monomer to form a calcium thiocyanate-containing polymer; shaping said calcium thiocyanate-containing polymer into a shaped article; treating the calcium thiocyanate-containing article with a solution of a water-soluble metal salt of metals selected from the group consisting of cobalt, copper, iron, lead, nickel and silver; reducing said metal of said soluble metal salt to water-insoluble particles of the free metal of said soluble salt; and, thereafter, drying the particle-containing shaped article at a temperature of 50–250° C.

2. A process as in claim 1 wherein said polymerizable monomer is composed of 100%, by weight, of acrylonitrile.

3. A process as in claim 1 wherein said water-soluble metal salt is ferric chloride.

4. A process as in claim 1 wherein said water-soluble metal salt is cuprous chloride.

5. A process as in claim 1 wherein said water-soluble metal salt is silver nitrate.

6. A process as in claim 1 wherein reduction is accomplished by treatment with a solution of sodium borohydride.

7. A process for preparing shaped polymeric articles which comprises the steps, in sequence, of mixing 24–45 mole percent of water, 5.5–18.5 mole percent of calcium thiocyanate and 24–60 mole percent of at least one polymerizable monomer, said monomer composed of 75–100%, by weight, of acrylonitrile and the remainder being an ethylenically unsaturated monomer copolymerizable with acrylonitrile, the mole percentages of the water, the calcium thiocyanate and the monomer falling within the area ABDE of FIGURE 1; polymerizing said monomer to form a calcium thiocyanate-containing polymer; shaping said calcium thiocyanate-containing polymer into a shaped article; treating the calcium thiocyanate-containing article with a solution of a water-soluble metal salt of metals selected from the group consisting of cobalt, copper, iron, lead, nickel and silver; reducing said metal of said soluble metal salt to water-insoluble particles of the free metal of said soluble salt; and, thereafter, drying the particle-containing shaped article at a temperature of 50–250° C.

8. A process for preparing shaped polymeric articles which comprises the steps, in sequence, of mixing 24–73 mole percent of water, 5–18.5 mole percent of calcium thiocyanate and 20–64 mole percent of at least one polymerizable monomer, said monomer composed of 75–100%, by weight, of acrylonitrile and the remainder being an ethylenically unsaturated monomer copolymerizable with acrylonitrile, the mole percentages of the water, the calcium thiocyanate and the monomer falling within the area ABCDEF of FIGURE 1; polymerizing said monomer to form a calcium thiocyanate-containing polymer; shaping said polymer into a shaped article; elongating said calcium thiocyanate-containing article in at least one direction; treating the calcium thiocyanate-containing article with a solution of a water-soluble metal salt of metals selected from the group consisting of cobalt, copper, iron, lead, nickel and silver while holding said article under tension; reducing said metal of said soluble metal salt to water-insoluble particles of the free metal of said soluble salt while holding said article under tension; and, thereafter, drying the particle-containing shaped article at a temperature of 50–250° C. while holding said article under tension.

9. A process for preparing a self-supporting polymeric film which comprises the steps, in sequence, of mixing 24–73 mole percent of water, 5–18.5 mole percent of calcium thiocyanate and 20–64 mole percent of at least one polmerizable monomer, said monomer composed of 75–100%, by weight, of acrylonitrile and the remainder being an ethylenically unsaturated monomer copolymerizable with acrylonitrile, the mole percentages of the water, the calcium thiocyanate and the monomer falling within the area ABCDEF of FIGURE 1; polymerizing said monomer to form a calcium thiocyanate-containing polymer; shaping said polymer into the form of a film; elongating the calcium thiocyanate-containing polymeric film at least 1.5× in at least one direction; treating the calcium thiocyanate-containing film with a solution of a water-soluble metal salt of metals selected from the group consisting of cobalt, copper, iron, lead, nickel and silver while holding said film under tension; reducing said metal of said soluble metal salt to water-insoluble particles of the free metal of said soluble salt while holding said film under tension; and, thereafter, drying the particle-containing self-supporting film at a temperature of 50–250° C. while holding said film under tension.

10. A process as in claim 9 wherein the film is stretched at least 1.5× in two mutually perpendicular directions.

11. A process as in claim 9 wherein said polymerizable monomer is composed of 100%, by weight, of acrylonitrile.

12. A process for preparing a self-supporting polymeric film which comprises the steps, in sequence, of mixing 24–45 mole percent of water, 5.5–18.5 mole percent of calcium thiocyanate and 24–60 mole percent of at least one polmerizable monomer, said monomer composed of 75–100%, by weight, of acrylonitrile and the remainder being an ethylenically unsaturated monomer copolymerizable with acrylonitrile, the mole percentages of the water, the calcium thiocyanate and the monomer falling within the area ABDE of FIGURE 1; polymerizing said monomer to form a calcium thiocyanate-containing polymer; shaping said polymer into the form of a film; elongating the calcium thiocyanate-containing polymeric film at least 1.5× in at least one direction; treating the calcium thiocyanate-containing film with a solution of a water-soluble metal salt of metals selected from the group consisting of cobalt, copper, iron, lead, nickel and silver while holding said film under tension; reducing said metal of said soluble metal salt to water-insoluble particles of the free metal of said soluble salt while holding said film under tension; and, thereafter, drying the particle-containing self-supporting film at a temperature of 50–250° C. while holding said film under tension.

13. A process as in claim 12 wherein the film is stretched at least 1.5× in two mutually perpendicular directions.

14. A process as in claim 12 wherein said polymerizable monomer is composed of 100%, by weight, of acrylonitrile.

References Cited in the file of this patent

UNITED STATES PATENTS

| | | |
|---|---|---|
| 2,140,921 | Rein | Dec. 20, 1938 |
| 2,417,293 | D'Alelio | Mar. 11, 1947 |
| 2,558,730 | Cresswell | July 3, 1951 |
| 2,684,348 | Dietrich et al. | July 20, 1954 |
| 2,721,114 | Downing et al. | Oct. 18, 1955 |
| 2,786,043 | Schuller et al. | Mar. 19, 1957 |
| 2,824,780 | Satterthwaite | Feb. 25, 1958 |
| 2,879,175 | Umblia et al. | Mar. 24, 1959 |